(12) United States Patent
Van Hoogenbemt

(10) Patent No.: US 12,022,203 B2
(45) Date of Patent: Jun. 25, 2024

(54) CONVERTING DIGITAL IMAGE DATA

(71) Applicant: ams Sensors Belgium BVBA, Berchem (BE)

(72) Inventor: Stefaan Margriet Albert Van Hoogenbemt, Mechelen (BE)

(*) Notice: Subject to any disclaimer, the term of this patent is extended or adjusted under 35 U.S.C. 154(b) by 70 days.

(21) Appl. No.: 18/011,777

(22) PCT Filed: Jun. 22, 2021

(86) PCT No.: PCT/EP2021/066999
§ 371 (c)(1),
(2) Date: Dec. 20, 2022

(87) PCT Pub. No.: WO2022/002697
PCT Pub. Date: Jan. 6, 2022

(65) Prior Publication Data
US 2023/0276137 A1    Aug. 31, 2023

(30) Foreign Application Priority Data
Jun. 29, 2020    (EP) ..................................... 20182937

(51) Int. Cl.
*H04N 23/80*    (2023.01)
*H04N 19/42*    (2014.01)
(Continued)

(52) U.S. Cl.
CPC ............. *H04N 23/80* (2023.01); *H04N 19/42* (2014.11); *H04N 25/78* (2023.01); *H04N 25/60* (2023.01)

(58) Field of Classification Search
CPC .... G06T 5/50; G06T 5/92; G06T 5/20; H04N 19/13; H04N 1/4072; H04N 5/20;
(Continued)

(56) References Cited

U.S. PATENT DOCUMENTS 6,930,711 B2    8/2005    Fukui et al.
2015/0280648 A1    10/2015    Vitali
(Continued)

OTHER PUBLICATIONS

Sutikno, "An Optimized Square Root Algorithm for Implementation in FPGA Hardware", Telkomnik, vol. 8, No. 1, Apr. 2010, Retrieved on Nov. 1, 2010 <https://www.researchgatenetpublication/45658191_An_Optimized_Square_Root_Algorithm_for_Implementation_in_FPGA_Hardware/fulltext/Oe60a723f0c4cf5df7c6359d/An-Optimized-SquareRoot-Algorithm-forImplementation-in-FPGAHardware.pdf; [retrievedan2020-11-191>, 8 pages.
(Continued)

*Primary Examiner* — Xi Wang
(74) *Attorney, Agent, or Firm* — MH2 TECHNOLOGY LAW GROUP LLP

(57) ABSTRACT

The present disclosure relates to a processing arrangement for converting digital image data. Conventional approaches suffer from speed or non-ideal compressing schemes. These drawbacks are overcome by the processing arrangement for determining a digital output value from a digital input value based on a linear function and a square root function. The processing arrangement includes a first calculation block configured to determine a first output value of the linear function, a second calculation block configured to determine a second output value of the square root function. A selector is configured to select, based on a comparison between the digital input value and a threshold value, whether the digital output value is determined by the first calculation block or by the second calculation block.

13 Claims, 5 Drawing Sheets

(51) Int. Cl.
  *H04N 25/60* (2023.01)
  *H04N 25/78* (2023.01)
(58) Field of Classification Search
  CPC ........ H04N 25/60; H04N 25/78; H04N 19/42; H04N 23/80
  See application file for complete search history.

(56) References Cited

U.S. PATENT DOCUMENTS

2018/0014016 A1* 1/2018 Basu ................. G01V 5/226
2018/0068427 A1 3/2018 Rotte et al.
2018/0211369 A1 7/2018 Leleannec et al.

OTHER PUBLICATIONS

Itu, "Recommendation ITU-R BT.709-6 Parameter values for the HDTV standards for production and international programme exchange: BT Series Broadcasting service (television)", International Telecommunication Union, Jun. 2015 <https://www.itu.inVdmsJJUbrec/itu-r/rec/bVR-REC-BT.709-6-201506-111PDF-E.pdf; [retrievedon 2017-02-021>, 19 pages.

Gowen et al., "Square root data compression", Review of Scientific Instruments, vol. 74, No. 8, Aug. 2003, 9 pages.

Lauritzen, Jan (EP Authorized Officer), International Search Report and Written Opinion in corresponding International Application No. PCT/EP2021/066999 mailed on Sep. 21, 2021, 11 pages.

* cited by examiner

CONVERTING DIGITAL IMAGE DATA

CROSS-REFERENCE TO RELATED APPLICATIONS

The present application is the national stage entry of International Patent Application No. PCT/EP2021/066999, filed on Jun. 22, 2021, and published as WO 2021/002697 A1 on Jan. 6, 2022, which claims priority to EP Application No. 20182937.1, filed on Jun. 29, 2020, all of which are incorporated by reference herein in their entireties.

The invention relates to a processing arrangement, an image sensor and a calculation method.

BACKGROUND OF THE INVENTION

In several applications, in particular sensor applications, continuous processing of the sensor signal is necessary. Some applications or standards require that a sensor value as read out from a sensor circuit is processed with a given formula. For example, the amount of data of a digital image coming from an image sensor can be reduced by using a compression scheme. The compression scheme could be performed according to a predefined function.

Such calculations usually are performed with conventional microprocessors having implemented specific standard calculation algorithms or having implemented a look-up table with pre-calculated values for each possible input value.

While the latter approach requires a large amount of memory and/or area on a semiconductor die, the speed of microprocessor calculation algorithms may be insufficient and/or arbitrary.

With regard to compression schemes as mentioned above an appropriate transfer curve has to be found. For example, a compressing of digital data according to a square root function could be a solution. However, for small pixel values of an image sensor, compressing the data according to a square root function may not be ideal.

It is an object of the invention to provide a processing arrangement for converting digital image data according to an optimized transfer curve in an efficient way. It is further an object to provide a calculation method for converting digital image data according to an optimized transfer curve.

This object is achieved with the processing arrangement and the calculation method according to the independent claims. Embodiments derive from the dependent claims.

SUMMARY OF THE INVENTION

In an embodiment the processing arrangement for converting digital image data is provided to determine a digital output value from a digital input value. That determining is based on a linear function and on a square root function. The processing arrangement comprises a first calculation block configured to determine a first output value of the linear function and a second calculation block configured to determine a second output value of the square root function. The processing arrangement further comprises a selector configured to select, based on a comparison between the digital input value and a threshold value, whether the digital output value is determined by the first calculation block or by the second calculation block.

In a preferred embodiment, the processing arrangement may be implemented as integrated circuit, wherein the first calculation block, the second calculation block and the selector form different parts of the integrated circuit. This means that the processing arrangement as a whole is implemented in hardware. However, in another embodiment the processing arrangement forms a processing unit, wherein at least the first calculation block, the second calculation block or the selector are software implementations on the processing unit.

Converting image data by determining a digital output value from a digital input value can mean that the image data are compressed. This means that the size of the digital input value is larger than the size of the digital output value. For example, the amount of bits of the digital input value is 12, while the amount of bits of the digital output value is 10. Therefore, image data are compressed from 12 bit representations to 10 bit representations. However, other compression degrees are also possible, for example from 12 bits to 8 bits or from 10 bits to 8 bits.

The linear function refers to converting the digital input value according to a transfer curve, which exhibits a constant gradient. The gradient of the transfer curve may be chosen to be 1. In that case, the image data, i.e. the digital input values, are transmitted uncompressed. However, the gradient of the transfer curve can also be different from 1.

The square root function refers to converting the digital input value according to a transfer curve, in which the digital output value depends on the square root of the digital input value. However, the digital output value may also dependent on other variables. For example, the digital output value may at least dependent on a maximum representable digital output value of the processing arrangement.

The selector can be placed before or after the first and the second calculation block. In case the selector is placed before the first and the second calculation block, the selection is conducted before any calculation is performed by the calculation blocks. Therefore, the first output value and the second output value have not to be determined both. Instead, only one of those output values is determined, based on the selection. In case the selector is placed after the first and the second calculation block, the first output value and the second output value are both determined.

The threshold value is a digital value. The threshold value could be represented as fixed or programmable hardware value.

Advantageously, converting digital image data according to a linear function and a square root function provides an effective compression scheme. The amount of data of a digital image can be reduced by using that compression scheme.

In practice, the linear function is used for converting digital input values, which are small, in particular smaller than the threshold value. Moreover, the gradient of the linear function can be chosen to be 1. As such, small illumination values of an image sensor's pixel are transmitted unchanged, which reduces the complexness of the processing arrangement. Besides, low illumination values have not to be compressed, since the amount of significant bits is already small.

The square root function is used for converting digital input values, which are larger than the threshold value. The shot noise of an image sensor's pixel, which refers to a quantum noise effect related to the discreteness of photons and electrons, is also the square root of its value. As such, the error introduced by the compression according to the square root function is equidistant from the error, which is always present.

For example, the processing arrangement is used as a circuit or in a circuit that can calculate the opto-electronic transfer characteristics of image pixels. When using the proposed processing arrangement, an approach of existing recommendations can be made. These recommendations are, e.g., ITU-R BT.709-6, ITU-R BT.2020-2 and ITU-R BT.2100-0. The result of the calculation may not be according to these recommendations, but it may happen that the error is within the noise margin of an image sensor's pixel.

Moreover, when using that compression scheme, the amount of image data will be reduced, but the compressed image can still be used without having to reconstruct it again. The compressed image still respects the visual content.

In an embodiment of the processing arrangement the linear function is defined by y1=A·IN, where y1 is the first output value, A is a first factor and IN is the digital input value. The square root function is defined by y2=C·$\sqrt{\text{IN}-\text{D}}$–B, where y2 is the second output value, C is a second factor, B is a first subtrahend and D is a second subtrahend.

Advantageously, the linear function and the square root function can be adjusted by adjusting the first factor, the second factor, the first subtrahend and the second subtrahend.

In an embodiment of the processing arrangement a combined function is formed by applying the linear function for digital input values smaller than the threshold value and by applying the square root function for digital input values larger than the threshold value. Besides, the combined function is continuous at the threshold value. The first subtrahend is determined by $$B = \frac{C^2}{2 \cdot A} - A \cdot XLIN,$$

where XLIN is the threshold value. The second subtrahend is determined by $$D = XLIN - \frac{C^2}{4 \cdot A^2},$$

and the second factor is determined by $$C = \frac{YMAX - A \cdot XLIN}{\sqrt{XMAX - \frac{YMAX}{A}}}.$$

In the last formula, YMAX is a maximum digital output value and XMAX is a maximum digital input value of the processing arrangement.

By choosing the variables B, C and D as mentioned above, the combined function is continuously differentiable at the threshold value. This means that the derivative of the linear function is equal to the derivative of the square root function at that point.

In practice, the first factor can be chosen to be A=1. All variables A, B, C, D and XLIN can be represented as fixed or programmable hardware values. The maximum digital output value, YMAX, and the maximum digital input value, XMAX, may be given values of the processing arrangement. For example, the digital input values come from an analog-to-digital converter (ADC) connected to an image sensor. If those digital input values are 12 bit representations, the maximum digital input value is $2^{12}$. If the processing arrangement converts those 12 bit representations into 10 bit representations, the maximum digital output value is $2^{10}$.

Advantageously, the combined function comprises two distinctive parts, the linear function and the square root function, which are forming one curve together and which are not showing any discontinuity. When the processing arrangement is implemented in a digital calculation circuit, the reverse calculation required to restore the original image can be extracted directly from the formulas as there is no uncertainty due to silicon technology variations. Due to the properties of the combined function a converted image still respects the visual content.

Depending on the selection of the maximum digital input value, the maximum digital output value and the threshold value the first factor, the second factor, the first subtrahend and the second subtrahend can be adjusted accordingly. This allows the proposed compression scheme to be used by processing arrangements that have different input or output ranges.

In an embodiment of the processing arrangement the second calculation block further comprises at least one left shift operator. The left shift operator is configured to shift, based on the size of the digital input value, the digital input value and the second subtrahend two-bit-wise to the side of the Most Significant Bit, MSB. In this embodiment the second calculation block further comprises at least one right shift operator, which is configured to shift a digital intermediate value bit-wise to the side of the Least Significant Bit, LSB. The digital input value and the second subtrahend, in particular their difference, form a digital input word for the square root calculation. The left shift operator shifts, based on the size of the digital input value, the digital input word two-bit-wise to the MSB side. The newly created bits at the LSB side are replaced by zeroes. This is done before the calculation of the square root. The two-bit-wise left shifting corresponds to a multiplication of the digital input word with a factor $2^{2n}$, where n is a natural number, which corresponds to the number of two-bit-wise left shift operations. For example, if n equals 1, the digital input word is multiplied by 4 by adding 2 zeroes at the LSB side of the digital input word. If n equals 2, the digital input word is multiplied by 16 by adding 4 zeroes at the LSB side of the digital input word.

Since the digital input word is artificially increased by the left shift operator, a digital output word of the square root calculation has to be decreased by the right shift operator in order obtain the correct result. The digital output word can be the digital intermediate value mentioned above.

However, since the two-bit-wise shifting of the digital input word is conducted before the calculation of the square root, the right shift operation after the square root calculation is only bit-wise, which corresponds to a division by the factor $2^n$. The introduction of the left shift and right shift operations can be seen in the following formula:

$$\text{OUT} = C \cdot \sqrt{\text{IN} - D} - B = C \cdot \frac{1}{2^n} \cdot \sqrt{2^{2n} \cdot (\text{IN} - D)} - B$$

While the term under the square root is multiplied with the factor $2^{2n}$, the resulting value of the square root calculation is divided by the factor $2^n$. This means that the digital output word is right shifted by half as many bits as the digital input word was left shifted. This also means that n corresponds to the number of shift operations, wherein in case of the left operations the shifting is two-bit-wise and in case of the right shift operations the shifting is bit-wise.

However, no shifting operations by the left shift operator and the right shift operator is required, if the size of the digital input value already uses the full capacity of the processing arrangement's data path.

Advantageously, for cases where the data size of the incoming data, i.e. the digital input values, is smaller than the data path of the processing arrangement, the shifting mechanism is provided to shift up the data by the left shift operator. By doing so, the processing arrangement's full calculation capacity is used for the calculation of bits behind the digital point, enhancing the final result.

In an embodiment of the processing arrangement the second factor in the second calculation block comprises a mantissa term and an exponential term. A multiplication of a digital value with the exponential term corresponds to a shift operation of that digital value.

This means that the second factor C can be represented as follows: $C=C_{vol} \cdot C\_exp = C\_val \cdot 2^{-m}$, where C_val is the mantissa term, C_exp is the exponential term and m is a natural number. Since the exponential term is given by an exponent with base value 2, the multiplication of a digital value with the exponential term can be implemented as a bit-wise shift operation of the digital value, where m determines the number of bits to be shifted. The minus sign in the exponent determines that the shift operation is a right shift operation.

Advantageously, by representing the second factor as a mantissa term and an exponential term the multiplication of the second factor with the result of the square root calculation can be optimized. Usually, the multiplication is conducted by a multiplier circuit, which is typically quite large in an application-specific integrated circuit, ASIC. The mantissa term contains the significant path of the second factor, which is optimized for the multiplication. The multiplier circuit can therefore be designed more efficiently. On the other hand, the exponential term corresponds to a shift operation, which usually can be implemented in a circuit quite easily.

In an embodiment of the processing arrangement the second calculation block further comprises a noise injection operator. The noise injection operator is configured to add a random value to the LSB-side of a further digital intermediate value.

This can mean that the random value is added to the further digital intermediate value after its digital point. The further digital intermediate value may be a temporary result after the calculation of the square root.

Advantageously, noise can be injected in case specific artefacts could be seen in the image. By injecting noise these artefacts can be randomized so that they are not visible anymore in the whole image or in a sequence of images.

In an embodiment of the processing arrangement the second calculation block further comprises a rounding operator configured to round a second further digital intermediate value up to a predetermined accuracy.

The second further digital intermediate value can be a temporary result after adding the random value by the noise injection operator. For example, the first bit behind the digital point may be used for rounding purposes.

Advantageously, the size of the digital output value can be further reduced by means of the rounding operator. For example, the first bit behind the digital point may be used for rounding purposes, while the remaining bits on the right side (LSB-side) of that bit can be truncated. By doing so, the desired accuracy of the digital output value can still be maintained.

In an embodiment of the processing arrangement the second calculation block further comprises a clipping operator. The clipping operator is configured to clip a third further digital intermediate value in case it exceeds the maximum digital output value.

Clipping may be performed in case that the third further digital intermediate value should exceed the maximum digital output value with a certain number of output bits. The third further digital intermediate value may be the determined value by the rounding operator.

Advantageously, by providing the clipping operator an overflow of the conversion is prevented. This overflow could be caused by an inappropriate increase of the calculated value by means of the noise injection operator and the rounding operator.

In an embodiment the processing arrangement further comprises a bypass operator configured to control independently from the comparison between the digital input value and the threshold value, whether the digital output value is determined by one of the first and the second calculation block or by the unchanged digital input value. In the latter case the digital input value can be transmitted unchanged.

Advantageously, the bypass operator can be provided for modes of the processing arrangement, in which a compression of the image data is not necessary. For example, the first factor can be set to A=1, so that the digital input value is transmitted unchanged.

In an embodiment of the processing arrangement the second calculation block further comprises a cascade of circuits, the cascade being configured to determine a digital output word forming the square root of a digital input word. Each circuit within the cascade of circuits comprises a first input for receiving a portion of the digital input word of maximum two bits. Each circuit within the cascade of circuits further comprises a logic block configured to determine, based on the portion of the digital input word, an output bit of the digital output word and a temporary calculation rest. Besides, each circuit within the cascade of circuits further comprises a first output for forwarding of at least a portion of the digital output word as a temporary calculation result.

In a preferred embodiment, each circuit within the cascade of circuit receives exactly two bits of the digital input word via its first input. In case that the digital input word comprises an odd number of bits, logical "0" bits can be concatenated on the MSB side of the digital input word, so that the number of bits becomes even.

The first two bits on the MSB side of the digital input word are assigned to a first circuit within the cascade of circuits. The next two bits are assigned to a subsequent circuit and so on, until the last two bits, which are located on the LSB side of the digital input word, are assigned to a last circuit. As the number of bits of the digital input word is always the same according to the data path of the processing arrangement, the number of circuits is constant, too.

Each circuit within the cascade forwards at least a portion of the digital output word as a temporary calculation result via its first output. The temporary calculation result of the first circuit comprises the Most Significant Bit of the digital output word. The temporary calculation result of the next circuit comprises the two Most Significant Bits of the digital output word and so on, until the temporary calculation result of the last circuit comprises the full digital output word. Therefore, the number of bits of the temporary calculation result increases from one circuit to the next circuit by one bit.

In an embodiment of the processing arrangement each circuit except the first circuit and the last circuit within the cascade of circuits further comprises a second input for receiving the temporary calculation rest of a preceding circuit. Each of those circuits further comprises a third input for receiving the temporary calculation result from the first output of the preceding circuit. Besides, each of those circuits further comprises a second output for forwarding the temporary calculation rest of the circuit to the second input of a subsequent circuit.

This means that the third input of each of those circuits is connected to the first output of the preceding circuit via a data path. Also, the second input of each of those circuits is connected to the second output of the preceding circuit via another data path. As the temporary calculation result, also the temporary calculation rest increases from one circuit to the next circuit by one bit.

In an embodiment of the processing arrangement the first circuit within the cascade of circuits further comprises a second input for receiving a logical "0" as the temporary calculation rest and a second output for forwarding the temporary calculation rest of the first circuit to the second input of the subsequent circuit. In that embodiment the last circuit within the cascade of circuits further comprises a second input for receiving the temporary calculation rest from the second output of the preceding circuit and a third input for receiving the temporary calculation result from the first output of the preceding circuit. The first output of the last circuit forwards the output word.

Advantageously, by determining the square root of a digital input word by means of the cascade of circuits, no complicated microprocessor with an associated memory and software is required on or off chip. The implementation with distinct instances of circuits within the cascade of circuits assures that a calculation time for each digital input word or digital output word remains constant, in particular independently from usually varying digital input values. This can be further useful when processing sequences of digital input values with a fixed data rate.

As the circuits are arranged cascaded such that an output of a preceding circuit in connected to an input of a subsequent circuit, the architecture of the processing arrangement can be pipelined. As such, large data throughputs can be achieved. Due to the pipelined architecture the conversion of the image data can be performed much faster than by a microprocessor. Moreover, each circuit within the cascade has a similar structure, so that the circuits can be efficiently designed.

In an embodiment the processing arrangement is implemented as an integrated circuit, in particular as an application-specific integrated circuit, ASIC.

The ASIC may be free from a microprocessor. Accordingly, all calculations as mentioned above are implemented with specific hardware representations. For example, no software or programming of a microprocessor are needed to perform the calculations mentioned above. However, a microprocessor can be comprised by the ASIC for other functions than the above-mentioned calculations.

With implementation as an integrated circuit, it is assumed that all variables, i.e. the first factor, the second factor, the first subtrahend, the second subtrahend and the threshold value, are chosen fixedly. Furthermore, the maximum digital input value and the maximum digital output value of the processing arrangement may also be chosen fixedly for a given desired application. However, the above mentioned variables may still be made programmable, e.g. via look-up tables.

Advantageously, the processing arrangement does not need a microprocessor on chip. This has the positive effect that the power consumption of the circuitry is reduced. Moreover, the integrated circuit can be small, as no dedicated memory of a microprocessor is required.

In an embodiment the processing arrangement is comprised by an image sensor. The image sensor provides sensor values from a plurality of image pixels and the processing arrangement converts the sensor values, in particular in a serial fashion.

In various implementations the processing arrangement can be directly implemented e.g. on an image sensor providing thousands or millions of sensor values within a limited time frame, i.e. a frame rate of the image sensor. Generally speaking, such a processing arrangement can be implemented in the digital data path of image sensors that can be used in film cameras or image cameras (e.g. 4K-HD and others).

Advantageously, the processing arrangement is implemented as pipelined integrated circuit. As such it achieves high throughputs, so that it can be implemented in image sensors, where a certain frame rate is required. This is hardly reachable with conventional architectures using microprocessors.

The processing arrangement can also be implemented or described as a calculation method for converting digital image data by determining a digital output value from a digital input value based on a linear function and a square root function. Such calculation method comprises selecting, based on a comparison between the digital input value and a threshold value, whether the digital output value is determined by a first output value or a second output value.

The method further comprises determining the first output value of the linear function and/or determining a second output value of the square root function by conducting a square root calculation procedure.

As mentioned above, selecting, whether the digital output value is determined by the first output value or the second output value can be conducted before or after determining the first and the second output value. In case selecting is conducted before, the first output value and the second output value have not to be determined both. Instead, only one of those output values is determined, based on the selection. However, it is also possible that selecting is conducted after determining the first and the second output value, which are therefore both calculated. Then, depending on the selection, one of the output values is discarded.

Advantageously, converting digital image data according to a linear function and/or a square root function provides an effective compression scheme. By using the linear function small illumination values of an image sensor's pixel can be transmitted unchanged. By using the square root function the error introduced by the compression is equidistant from the shot noise of the pixel. Moreover, when using that compression scheme, the compressed image can still be used without having to reconstruct it again, since the compressed image still respects the visual content.

In an embodiment of the calculation method the linear function is defined by $y1 = A \cdot IN$, wherein $y1$ is the first output value, $A$ is a first factor and $IN$ is the digital input value. The square root function is defined by $y2 = C \cdot \sqrt{IN-D} - B$, where $y2$ is the second output value, $C$ is a second factor, $B$ is a first subtrahend and $D$ is a second subtrahend.

Advantageously, the linear function and the square root function can be adjusted by adjusting the first factor, the second factor, the first subtrahend and the second subtrahend.

In an embodiment of the calculation method determining the second output value may further comprise shifting, based on the size of the digital input value, the digital input value and the second subtrahend two-bit-wise to the side of the Most Significant Bit, MSB. In that embodiment a digital input word is determined by applying the formula INW=IN'−D', where IN' is the shifted digital input value and D' is the shifted second subtrahend.

Determining the second output value further comprises determining a digital output word OUTW=$\sqrt{INW}$ by performing the square root calculation procedure.

In an embodiment determining the second output value may further comprise providing the second factor as a mantissa term and an exponential term. In that embodiment a digital intermediate value is determined by applying the formula IMD1=C_VAL·OUTW, where IMD1 is the digital intermediate value and C_VAL is the mantissa term of the second factor. After that and based on the size of the digital input value and the exponential term of the second factor, the digital intermediate value is shifted bit-wise to the side of the Least Significant Bit, LSB. Then, a further digital intermediate value, IMD2, is determined by applying the formula IMD2=IMD1'−B, where IMD1' is the shifted digital intermediate value.

Advantageously, by left shifting and right shifting of the digital input values and the digital intermediate values the performance of the calculation method can be enhanced. This means that multiplying and calculating the square root can be performed more effectively.

In an embodiment of the calculation method the square root calculation procedure comprises determining a digital output word from a digital input word, wherein the digital output word forms the square root of the digital input word. The method further comprises splitting the digital input word into portions of maximum two bits. Each portion of the digital input word is assigned to subsequent calculation steps, starting with the portion on the MSB-side of the digital input word and proceeding with subsequent portions towards the LSB-side.

Each calculation step comprises forming a temporary calculation rest by concatenating the respective portion of the calculation step to the temporary calculation rest of a preceding calculation step, if a preceding calculation step is present. The calculation step further comprises determining an internal calculation error Y=4·R+1, where R is a temporary result of the preceding calculation step, if a preceding calculation step is present. The calculation step further comprises comparing the temporary calculation rest with the internal calculation error.

A logical "1" bit is concatenated to the temporary result, if the internal calculation error is smaller than or equal as the temporary calculation rest. Also, the temporary calculation rest is adjusted by subtracting the internal calculation error, if the internal calculation error is smaller than or equal as the temporary calculation rest. If the internal calculation error is larger than the temporary calculation rest, a logical "0" bit is concatenated to the temporary result.

Advantageously, by dividing the square root calculation into subsequent calculation steps, each step providing one bit of the digital output word, the square root of the digital input word is calculated in an effective and reliable way. As such, the calculation method is fast and provides high data throughputs. Moreover, no memory is required to perform the square root calculation procedure, as the temporary calculation results are directly forwarded to subsequent calculation steps. As each pair of bits of a digital input word is assigned to a dedicated calculation step, it is assured that the calculation time remains constant, in particular independently from usually varying digital input words. This can be further useful when processing sequences of digital input values with a fixed data rate.

Further implementations of the calculation method become readily apparent for the skilled person from the various descriptions made with respect to the embodiments of the processing arrangement.

The improved conversion concept will be described in more detail in the following with the aid of drawings. Elements having the same or similar function bear the same reference numerals throughout the drawings. Hence their description is not necessarily repeated in subsequent drawings.

DETAILED DESCRIPTION

Figure 1:
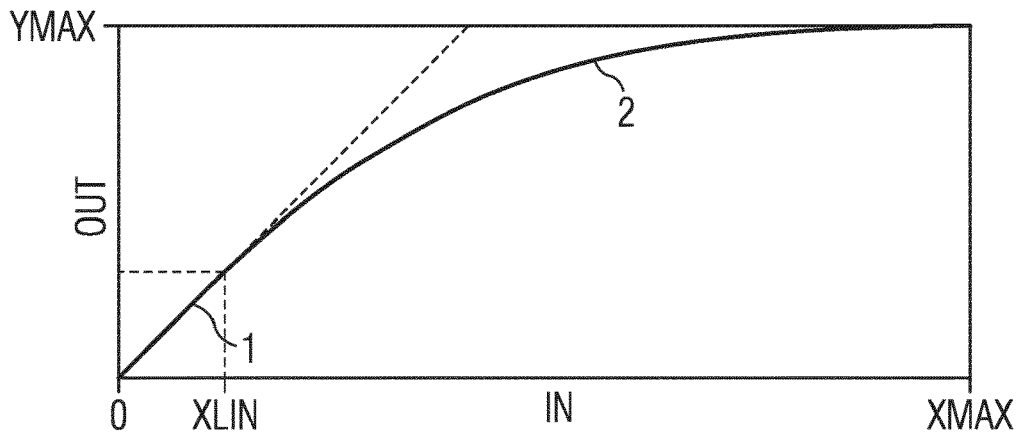
FIG. 1 shows a transfer curve comprising two distinctive parts according to a linear function and a square root function.

In FIG. 1 a transfer curve is shown, according to which the conversion of digital input values IN into digital output values OUT can be performed. On the x-axis the digital input values are shown, which can reach a maximum digital input value XMAX. On the y-axis the digital output values are shown, which can reach a maximum digital output value YMAX.

The transfer curve forms a combined function, which comprises two distinctive parts. The first part is formed by a linear function 1 describing the equation OUT=A·IN, with a first factor A. The first part of the combined function forming the linear function 1 is only valid for digital input values in the range from zero, IN=0, to a threshold value XLIN, IN=XLIN. The second part of the combined function is formed by a square root function 2 describing the equation OUT=C·$\sqrt{IN-D}$-B, with a first subtrahend B, a second factor C and a second subtrahend D. The second part of the combined function forming the square root function 2 is only valid for digital input values in the range from the threshold value XLIN, IN=XLIN, to the maximum digital input value XMAX, IN=XMAX.

The combined function is continuously differentiable at the threshold value XLIN. As such, both function values and the derivatives of the linear function 1 and the square root function 2 are equal at the threshold value XLIN. This can be written as $$A = \frac{C}{2 \cdot \sqrt{XLIN - D}} \tag{1}$$

-continued
$$A \cdot XLIN = C \cdot \sqrt{XLIN - D} - B. \quad (2)$$

Replacing the square root in formula (2) by the one on formula (1) leads to $$B = \frac{C^2}{2 \cdot A} - A \cdot XLIN. \quad (3)$$

At the maximum digital input value XMAX, the square root function 2 should obtain the result YMAX. This means that YMAX=C·√XMAX−D−B, where the second subtrahend D can be replaced by an expression coming from equation (1) and the first subtrahend B can be replaced by an expression coming from equation (2). This leads to the second factor C:

$$C = \frac{YMAX - A \cdot XLIN}{\sqrt{XMAX - \frac{YMAX}{A}}}. \quad (4)$$

Inserting this expression for the second factor C into the equations (1) and (2) leads to the second subtrahend D:

$$D = XLIN - \frac{C^2}{4 \cdot A^2}. \quad (5)$$

In practical applications of applying the transfer curve shown in FIG. 1, the first factor A can be chosen to be 1. This further simplifies the equations (3) to (5). However, the first factor A can also be chosen to be different than 1.

The transfer curve shown in FIG. 1 can be used to convert digital image data. As such, the conversion corresponds to a compression of data. In the following Figures it is shown, how a compression according to the transfer curve can be implemented in a processing arrangement 3 and/or in a calculation method for converting digital image data.

Figure 2:
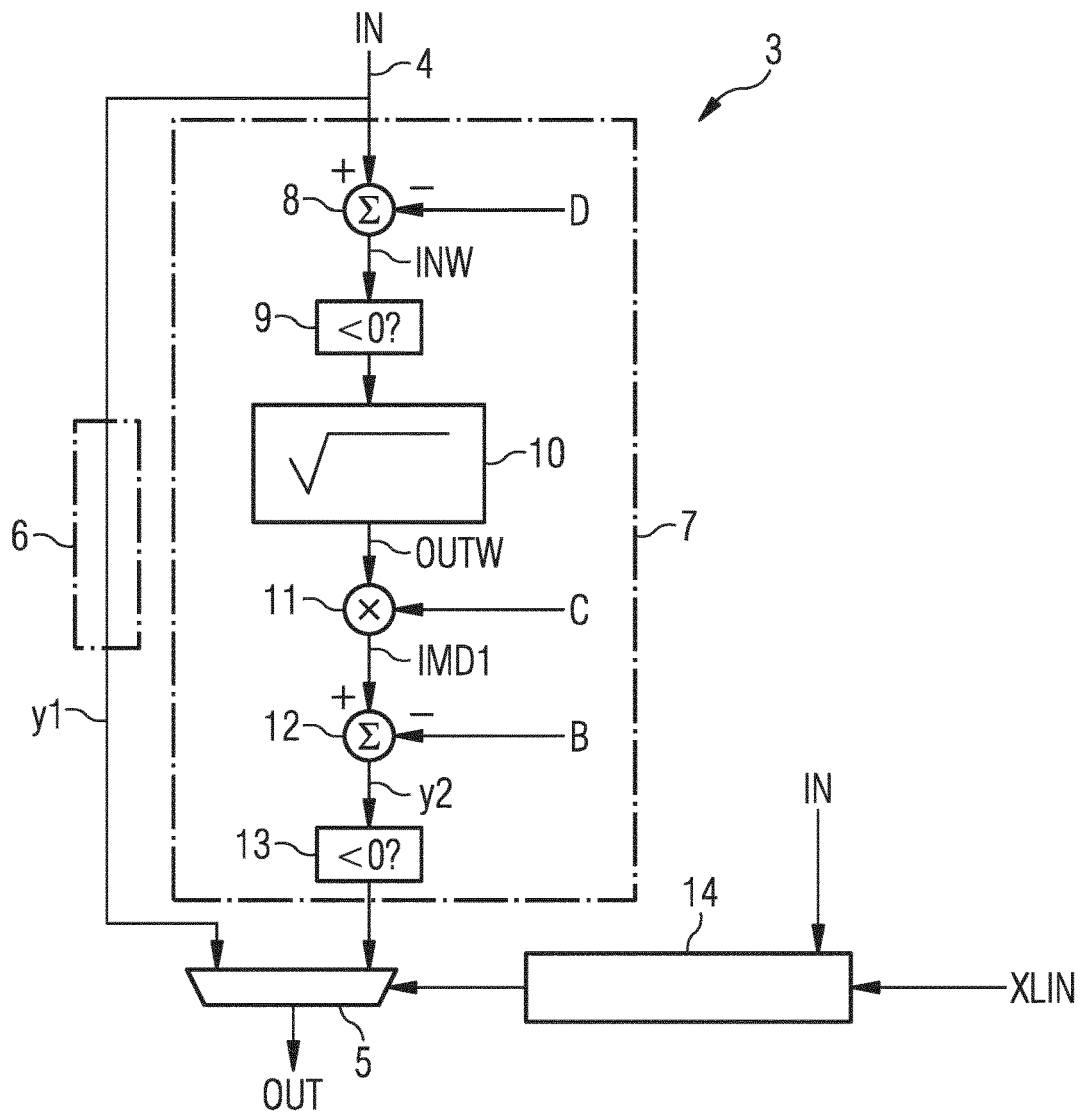
FIG. 2 shows an embodiment of a processing arrangement.

FIG. 2 shows an embodiment of a processing arrangement 3 for converting digital image data according the transfer curve shown in FIG. 1. However, FIG. 2 can also be interpreted as block diagram for a calculation method for determining a digital input value IN from a digital output value OUT based on the transfer curve shown in FIG. 1. The processing arrangement 3 comprises an input 4 for receiving the digital input value IN. The processing arrangement further comprises a first calculation block 6, which is configured to determine a first output value y1. The first calculation block 6 is connected to the input 4 of the processing arrangement 3, so that the first calculation block 6 receives the digital input value IN. In the embodiment shown in FIG. 2 the first calculation block 6 transmits the digital input value IN unchanged. This means that the first factor A is chosen to be 1, so that the first output value y1 equals the digital input value IN.

The processing arrangement 3 further comprises a second calculation block 7, which is configured to determine a second output value y2. The second calculation block 7 is connected to the input 4 of the processing arrangement 3, so that the second calculation block 7 receives the digital input value IN. The digital input value IN is forwarded to a first sum operator 8, which is configured to subtract the second subtrahend D from the digital input value IN and to forward the result of this subtraction as a digital input word INW.

The second calculation block 7 further comprises a first tester 9, which is connected at its input side to the first sum operator 8. The first tester 9 checks if the digital input word INW is positive. If this is the case, the digital input word INW is transmitted unchanged. If this is not the case, the digital input word INW is set to zero.

The second calculation block 7 further comprises a square root operator 10 connected at its input side with the first tester 9. The square root operator 10 is configured to determine a digital output word OUTW from the digital input word INW by calculating the square root of the digital input word INW.

The digital output word OUTW is forwarded to a multiplier 11 of the second calculation block 7, which is configured to multiply the second factor C with the digital output word OUTW and to forward the result of this multiplication as digital intermediate value IMD1.

The digital intermediate value IMD1 is forwarded to a second sum operator 12, which is configured to subtract the first subtrahend B from the digital intermediate value IMD1 and to forward the result of this subtraction as a second output value y2.

The second calculation block 7 further comprises a second tester 13, which is connected at its input side to the second sum operator 12. The tester 13 checks if the second output value y2 is positive. If this is the case, the second output value y2 is transmitted unchanged. If this is not the case, the second output value y2 is set to zero.

The second calculation block 7 further comprises a selector 14, which is configured to select, based on a comparison between the digital input value IN and a threshold value XLIN, whether the digital output value OUT is determined by the first calculation block 6 or by the second calculation block 7.

The result of that selection is forwarded to an output 5 of the processing arrangement 3, where the first output value y1 and the second output value y2 are provided. Based on the selection by the selector 14, either the first output value y1 or the second output value y2 is forwarded by the output 5 as digital output value OUT.

Figure 3:
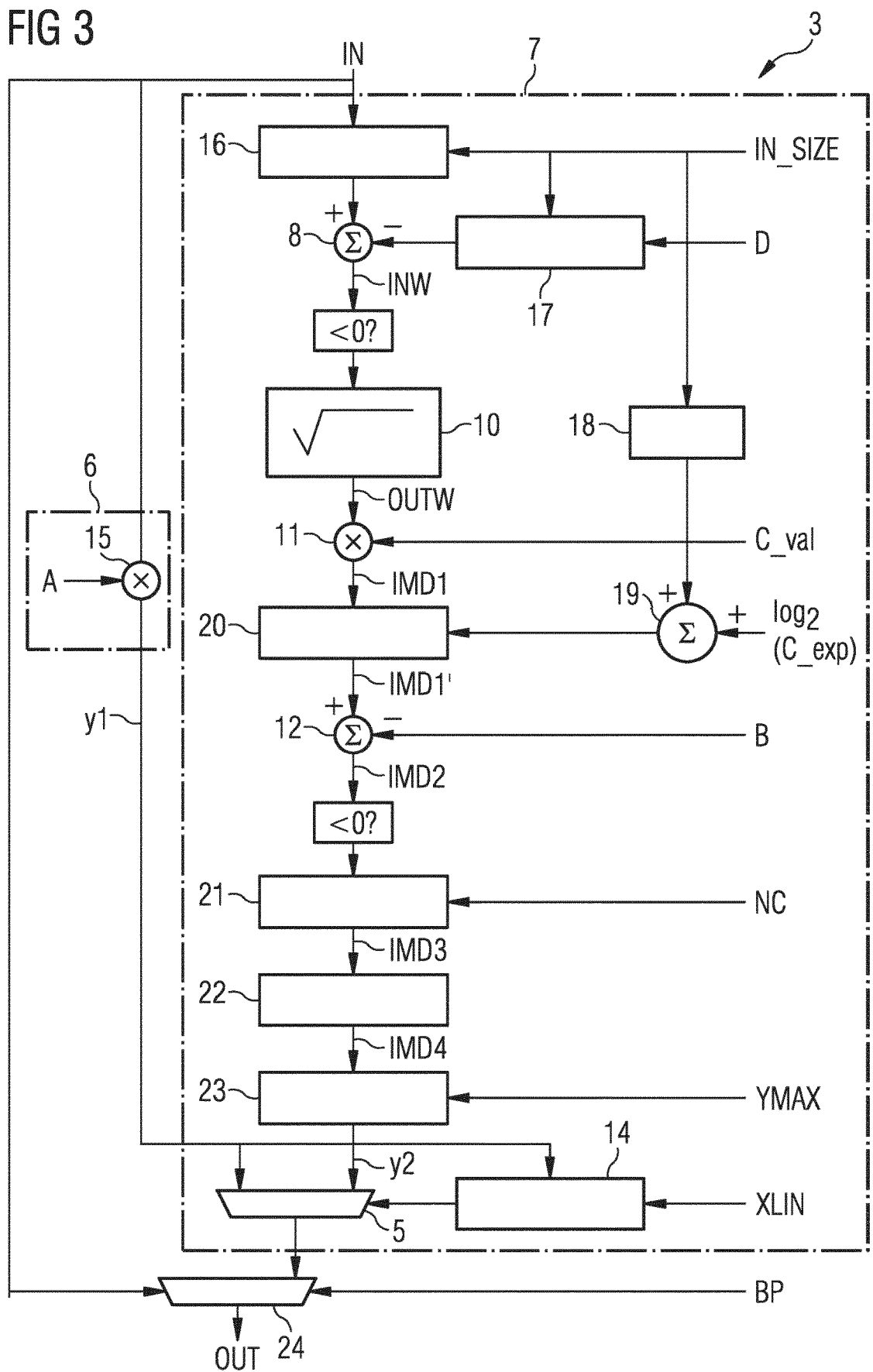
FIG. 3 shows another an embodiment of a processing arrangement.

FIG. 3 shows another embodiment of the processing arrangement 3. However, FIG. 3 can also be interpreted as block diagram for another embodiment of the calculation method for determining a digital input value IN from a digital output value OUT based on the transfer curve shown in FIG. 1.

The processing arrangement 3 of FIG. 3 differs from the processing arrangement 3 shown in FIG. 2 inter alia in that the first calculation block 6 comprises a multiplier, which is configured to multiply the first factor A with the digital input value IN and to forward the result of this multiplication as first output value y1.

Besides, the second calculation block 7 comprises a first left shift operator 16, which is configured to shift, based on the size IN_SIZE of the digital input value IN, the digital input value IN two-bit-wise to the side of the Most Significant Bit, MSB. The second calculation block 7 further comprises a second left shift operator 17, which is configured to shift, based on the size IN_SIZE of the digital input value IN, the second subtrahend D two-bit-wise to the MSB side. This means that the number of two-bit-wise left shift operations depends on the size IN_SIZE of the digital input value IN.

In case that the digital input value IN and the second subtrahend D is shifted, the sum operator 8 is configured to subtract the shifted second subtrahend D from the shifted digital input value IN and to forward the result of this subtraction as a digital input word INW. Therefore, the sum operator 8 is connected at its input side to the first left shift operator 16 and to the second left shift operator 17.

In the embodiment shown in FIG. 3 the second factor C is provided as a mantissa term C_val and an exponential term C_exp. The multiplier 11 of the second calculation block 7 is configured to multiply the mantissa term C_val with the digital output word OUTW, which has been determined from the digital input word INW by the square root operator 10. Besides, the result of this multiplication is forwarded as digital intermediate value IMD1.

The second calculation block 7 further comprises a back shifting operator 18, which determines, based on the size IN_SIZE of the digital input value IN, how many bit-wise right shift operations are required for the digital output word OUTW in order to compensate the two-bit-wise left shift operations of the digital input word INW. The number of bit-wise right shift operations may equal the number of two-bit-wise left shift operations in order to compensate the left shift operations.

The result of the determining by the back shifting operator 18 is added to the exponent of the exponential term C_exp in a third sum operator 19. The second calculation block 7 further comprises a right shift operator 20, which is configured to shift the digital intermediate value IMD1 to the side of the Least Significant Bit, LSB, by a certain number of bits. The number of bit-wise right shift operations is based on the result of the summation performed by the third sum operator 19. The right shift operator 20 forwards the shifted digital intermediate value IMD1'.

The shifted digital intermediate value IMD1' is forwarded to the second sum operator 12, which is configured to subtract the first subtrahend B from the shifted digital intermediate value IMD1' and to forward the result of this subtraction as further digital intermediate value IMD2.

The embodiment shown in FIG. 3 further comprises a noise injection operator 21, which is connected at its input side to the second sum operator 12. The noise injection operator 21 is configured to add a random value NC to the LSB side of the further digital intermediate value IMD2. The noise injection operator forwards a second further intermediate value IMD3 as result of this operation.

The embodiment of FIG. 3 further comprises a rounding operator 22, which is connected at its input side to the noise injection operator 21. The rounding operator 22 is configured to round the second further digital intermediate value IMD3 up to a predetermined accuracy. The rounding operator 22 forwards a third further intermediate value IMD4 as result of this operation.

The embodiment of FIG. 3 further comprises a clipping operator 23 which is connected at its input side to the rounding operator 22. The clipping operator 23 is configured to clip the third further digital intermediate value IMD4 in case it exceeds the maximum digital output value YMAX. For that, the clipping operator 23 compares the size of the third further digital intermediate value IMD4 with the maximum digital output value YMAX. The clipping operator 23 forwards the second output value y2 as result of this operation to the output 5 of the processing arrangement 3.

In the embodiment of FIG. 3 the processing arrangement 3 further comprises a bypass operator 24 configured to control whether the digital output value OUT is determined by one of the first and the second output values y1, y2, based on the selection made by the selector 14, or by the unchanged digital input value IN. If a bypass control variable BP is activated, the bypass operator 24 assigns the digital input value IN to the digital output value OUT, independently from the selection made by the selector 14. Otherwise, the selection made by the selector 14, i.e. the first output value y1 or the second output value y2, is assigned to the digital output value OUT.

Figure 4:
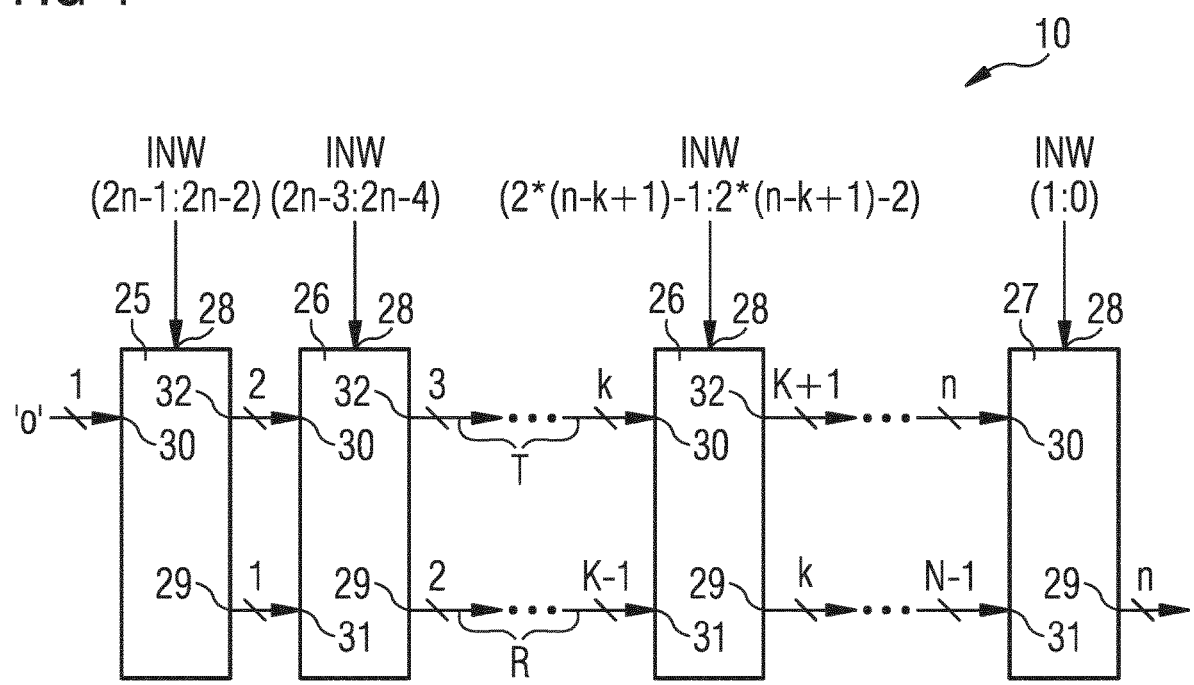
FIG. 4 shows an embodiment of a cascade of circuits for calculating the square root of a digital input word.

FIG. 4 shows an embodiment of the square root operator 10. The square root operator 10 comprises a cascade of circuits 25, 26, 27. The cascade of circuits 25, 26, 27 comprises a first circuit 25, further circuits 26 and a last circuit 27. The cascade of circuits 25, 26, 27 is configured to determine the digital output word OUTW forming the square root of the digital input word INW. Each circuit 25, 26, 27 of the cascade of circuits comprises a first input 28 for receiving a portion of the digital input word INW of two bits. The digital input word INW comprises 2n bits, where n is a natural number. Therefore, the digital input word INW comprises an even number of bits. The first circuit 25 receives the first two bits INW(2n−1:2n−2) on the MSB side of the digital input word INW. The next further circuit 26 receives the next two bits INW(2n−3:2n−4) on the MSB side of the digital input word INW. This procedure is continued until the last circuit 27 receives the last two bits INW(1:0) on the LSB side of the digital input word INW. Therefore, the cascade of circuits 25, 25, 27 comprises n circuits.

Further circuits 26 are indicated in FIG. 4 by an ellipsis and an exemplary $k^{th}$ circuit 26, where k is another natural number.

Each circuit 25, 26, 27 of the cascade of circuits further comprises a first output 29 for forwarding of at least a portion of the digital output word OUTW as a temporary calculation result R. The first output 29 of the last circuit 27 forwards the output word OUTW.

Each circuit 26, 27, 28 further comprises a second input 30 for receiving a temporary calculation rest T. Each circuit 26, 27 except the first circuit 25 receives the temporary calculation rest T from a preceding circuit 25, 26. The first circuit 25 receives a logical "0" at the second input 30.

Each circuit 26, 27 except the first circuit 25 comprises a third input 31 for receiving the temporary calculation result R from the first output 29 of the preceding circuit 25, 26.

Each circuit 25, 26 except the last circuit 27 comprises a second output 32 for forwarding the temporary calculation rest T to the second input 30 of a subsequent circuit 26, 27.

The second output 32 of the circuit 25, 26 is therefore connected to the second input 30 of a subsequent circuit 26, 27 via a data path. The first output 29 of the circuit 25, 26 is connected to the third input 31 of a subsequent circuit 26, 27 via a further data path. The number of bits of the temporary calculation rest T transmitted by the data path increases by one bit after each circuit 25, 26. For example, the temporary calculation rest T comprises two bits after the first circuit 25 and three bits after the next further circuit 26. The number of bits of the temporary calculation result R transmitted by the further data path also increases by one bit after each circuit 25, 26, 27. For example, the temporary calculation result R comprises one bit after the first circuit 25, two bits after the next further circuit 26 and reaches n bits after the last circuit 27, as shown in FIG. 4.

Figure 5:
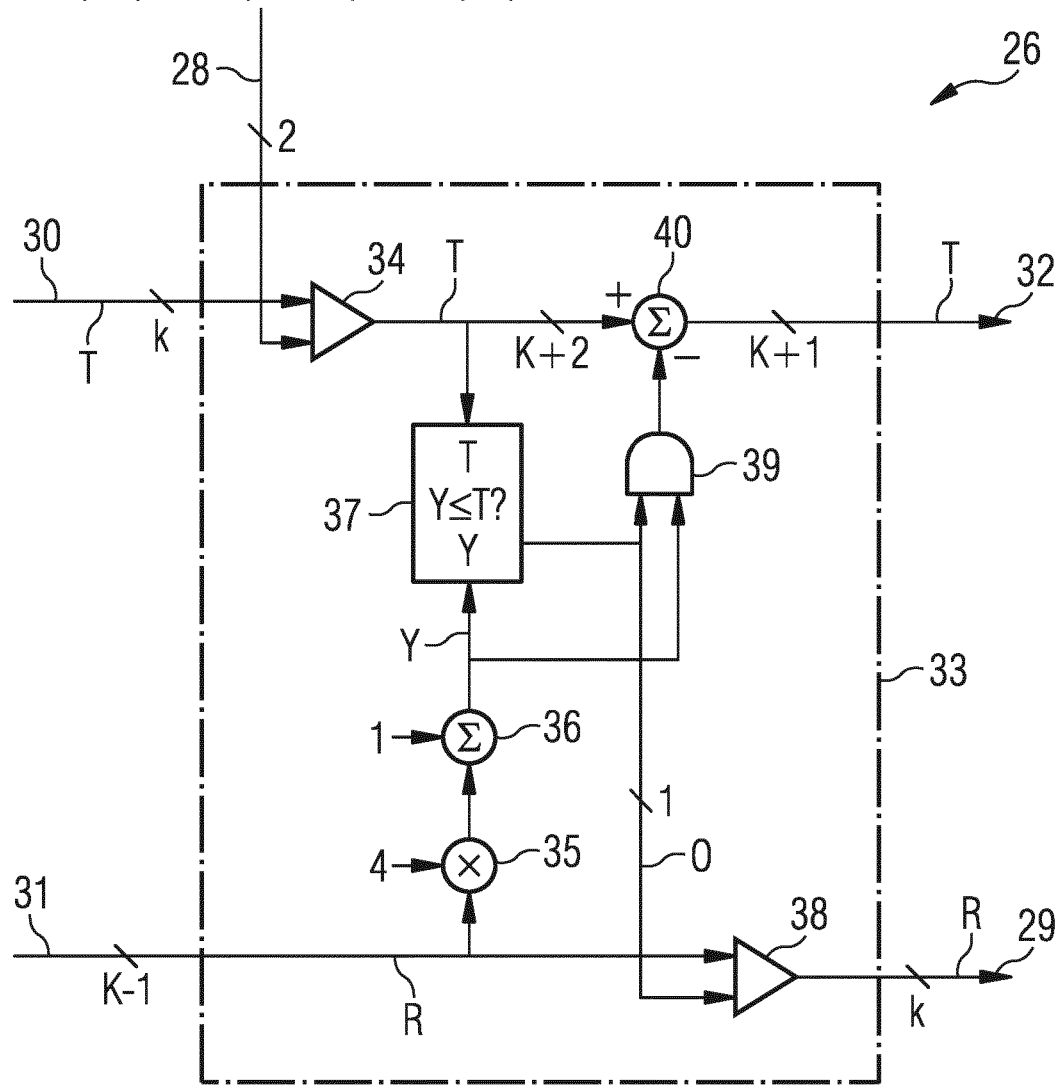
FIG. 5 shows an embodiment of one exemplary circuit within a cascade of circuits.

In FIG. 5 the $k^{th}$ circuit 26 of the cascade is shown in detail. The circuit 26 further comprises a logic block 33, which is configured to determine an output bit O of the digital output word OUTW and the temporary calculation rest T.

The logic block 33 comprises a first concatenator 34 connected to the first input 28 and the second input 30. The first concatenator 34 concatenates the respective two bits INW(2*(n−k+1)-1:2*(n−k+1)-2) of the digital input word INW to the temporary calculation rest T of the preceding circuit 26. This means that the temporary calculation rest T is updated by shifting the temporary calculation rest T two bits to the MSB side and replacing the newly added bits on the LSB side by the two bits INW(2*(n−k+1)-1:2*(n−k+1)-2).

The logic block 33 further comprises a multiplier 35 connected to the third input 31 and a first sum operator 36 connected to the multiplier 35 for calculating an internal calculation error Y. The internal calculation error Y is defined by Y=4·R+1. The multiplication with the factor 4 may be done by two bit-wise left shift operations.

The logic block 33 further comprises a comparator 37 which receives the updated temporary calculation rest T and the internal calculation error Y. The comparator 37 compares the updated temporary calculation rest T and the internal calculation error Y. If the internal calculation error Y is larger than the updated temporary calculation rest T the comparator 37 outputs a logical "0" as the output bit O. Otherwise the comparator 37 outputs a logical "1" as the output bit O.

The logic block 33 further comprises a second concatenator 38, which is connected to the output of the comparator 37 and the third input 31. The second concatenator 38 concatenates the output bit O to the temporary calculation result R of the preceding circuit 26. This means that the temporary calculation result R is updated by shifting the temporary calculation result R one bit to the MSB side and replacing the newly added bit on the LSB side by the output bit O. The result of this operation is forwarded as updated temporary result R to the first output 29 of the circuit 26.

The logic block 33 further comprises a multiplexer 39 receiving the output bit O and the internal calculation error Y. Only if the output bit O is "1", the internal calculation error Y is forwarded to a second sum operator 40, where the internal calculation error Y is subtracted from the temporary calculation rest T to form an updated temporary calculation rest T. Otherwise, if the output bit O is "0", the output bit O is forwarded to the second sum operator 40, which means that the temporary calculation rest T remains unchanged. The result of this operation is forwarded as updated temporary rest T to the second output 32 of the circuit 26.

Figure 6:
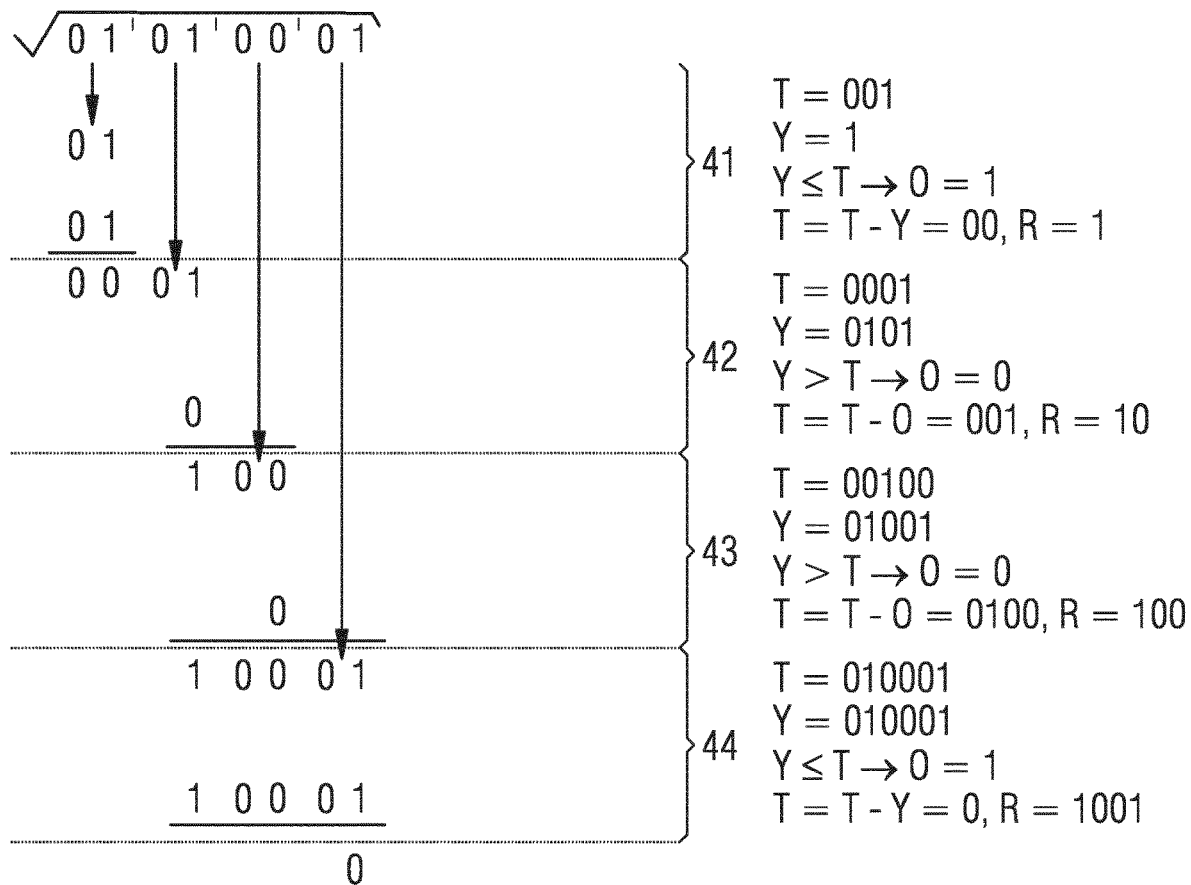
FIG. 6 shows an example for calculating the square root of an exemplary digital input word.

FIG. 6 shows an example of the functional principle of the square root operator 10 or of the calculation method as described above. In the example, the square root of the digital input word "01010001", which corresponds to the number 81 in the decimal system, is calculated. Since the digital input word comprises 8=4×2 bits, the calculation can be performed by four calculation steps (or by a cascade of four circuits 25, 26, 27, respectively). The four calculations steps are indicated in FIG. 6 by the reference numerals 41, 42, 43, 44. Intermediate results for the temporary calculation rest T, the internal calculation error Y, the output bit O and the temporary calculation result R of those calculation steps are also shown in FIG. 6.

At the beginning of the calculation the temporary calculation rest T and the temporary calculation result R are set to zero, T="0", R="0".

The calculation starts by assigning the first two bits "01" of the digital input word INW to the first calculation step 41 by concatenating them to the present temporary calculation rest T. Hereby, the temporary calculation rest T becomes T="001". The internal calculation error Y can be determined to be Y=4·R+1, so that Y="1". Since the internal calculation error Y is less than or equal to the temporary calculation rest T, Y≤T, an output bit O="1" is generated and concatenated to the temporary calculation result R, which becomes "1". The temporary calculation rest T is updated by subtracting the internal calculation error Y, so that T="00".

In the second calculation step 42 the next two bits "01" of the digital input word INW are concatenated to the present temporary calculation rest T. Hereby, the temporary calculation rest T becomes T="0001". The internal calculation error Y can be determined to be Y="0101", which is larger than the temporary calculation rest T. Therefore, an output bit O="0" is generated and concatenated to the temporary calculation result R, which becomes "10". The temporary calculation rest T is updated by subtracting the output bit O, so that it becomes T="001".

In the third calculation step 43 the next two bits "00" of the digital input word INW are concatenated to the present temporary calculation rest T. Hereby, the temporary calculation rest T becomes T="00100". The internal calculation error Y can be determined to be Y="01001", which is larger than the temporary calculation rest T. Therefore, an output bit O="0" is generated and concatenated to the temporary calculation result R, which becomes "100". The temporary calculation rest T is updated by subtracting the output bit O, so that it becomes T="0100".

In the fourth calculation step 44 the next two bits "01" of the digital input word INW are concatenated to the present temporary calculation rest T. Hereby, the temporary calculation rest T becomes T="010001". The internal calculation error Y can be determined to be Y="010001", which equals the temporary calculation rest T. Therefore, an output bit O="1" is generated and concatenated to the temporary calculation result R, which becomes "1001". The temporary calculation rest T is updated by subtracting the internal calculation error Y, so that T="0". This means that no rest is remaining. The temporary calculation result R is the digital output word OUTW="1001", which corresponds to the number 9 in the decimal system.

Figure 7:
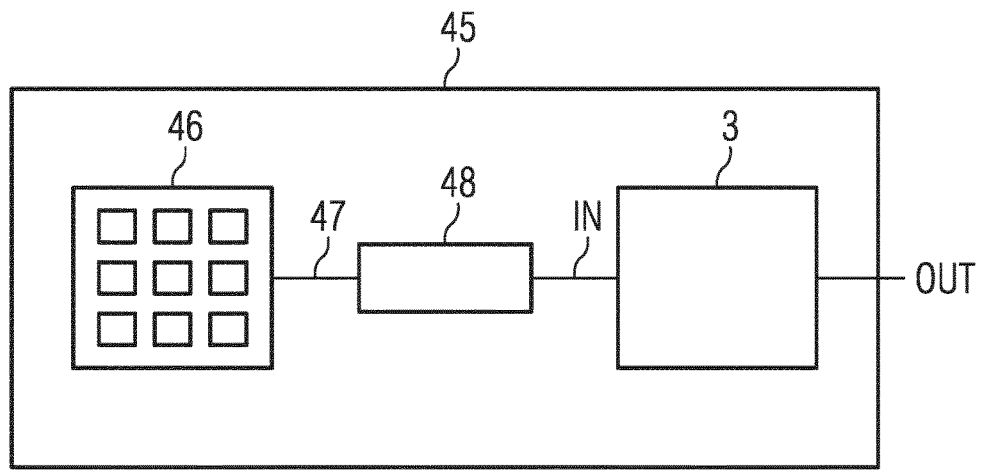
FIG. 7 shows an image sensor comprising a processing arrangement.

FIG. 7 shows an image sensor 45 comprising the processing arrangement 3. The image sensor also comprises a plurality of pixels 46. The pixels are configured to receive electromagnetic radiation and to generate an analog signal 47 as response to the electromagnetic radiation. The analog signals 47 may be converted, in particular in a serial fashion, by an analog-to-digital converter 48 into digital input values IN. The processing arrangement 3 receives the digital input values IN. Furthermore, the processing arrangement 3 converts each digital input value IN into a digital output value OUT in the described way. The image sensor 45 may comprise further components, for example an image processor, which is not shown in FIG. 7. The digital output value OUT can be further processed by the image processor.

The embodiments of the processing arrangement 3 and the calculation method disclosed herein have been discussed for the purpose of familiarizing the reader with novel aspects of the idea. Although preferred embodiments have been shown and described, many changes, modifications, equivalents and substitutions of the disclosed concepts may be made by one having skill in the art without unnecessarily departing from the scope of the claims.

It will be appreciated that the disclosure is not limited to the disclosed embodiments and to what has been particularly shown and described hereinabove. Rather, features recited in separate dependent claims or in the description may advantageously be combined. Furthermore, the scope of the disclosure includes those variations and modifications, which will be apparent to those skilled in the art and fall within the scope of the appended claims.

The term "comprising", insofar it was used in the claims or in the description, does not exclude other elements or steps of a corresponding feature or procedure. In case that the terms "a" or "an" were used in conjunction with features, they do not exclude a plurality of such features. Moreover, any reference signs in the claims should not be construed as limiting the scope.

The invention claimed is:

1. A processing arrangement for converting digital image data by determining a digital output value from a digital input value based on a linear function and a square root function, the processing arrangement comprising:
   a first calculation block configured to determine a first output value of the linear function,
   a second calculation block configured to determine a second output value of the square root function, and
   a selector configured to select based on a comparison between the digital input value and a threshold value whether the digital output value is determined by the first calculation block or by the second calculation block wherein
   the linear function is defined by y1=A·IN, A being a first factor, and wherein the square root function is defined by y2=C·√IN−D−B, C being a second factor, B being a first subtrahend and D being a second subtrahend.

2. The processing arrangement according to claim 1, wherein a combined function is formed by applying the linear function for digital input values smaller than the threshold value and by applying the square root function for digital input values larger than the threshold value, the combined function being continuous at the threshold value, so that
   the first subtrahend is determined by $$B = \frac{C^2}{2 \cdot A} - A \cdot XLIN,$$

the second subtrahend is determined by $$D = XLIN - \frac{C^2}{4 \cdot A^2},$$

and
   the second factor is determined by $$C = \frac{YMAX - A \cdot XLIN}{\sqrt{XMAX - \frac{YMAX}{A}}},$$

where YMAX is a maximum digital output value and XMAX is a maximum digital input value of the processing arrangement.

3. The processing arrangement according to claim 1, wherein the second calculation block further comprises
   at least one left shift operator configured to shift, based on the size of the digital input value, the digital input value and the second subtrahend two-bit-wise to the side of the Most Significant Bit, MSB, and
   at least one right shift operator configured to shift a digital intermediate value bit-wise to the side of the Least Significant Bit, LSB.

4. The processing arrangement according to claim 1, wherein in the second calculation block the second factor comprises a mantissa term and an exponential term and wherein a multiplication of a digital value with the exponential term corresponds to a shift operation of the digital value.

5. The processing arrangement according to claim 1, wherein the second calculation block further comprises
   a noise injection operator configured to add a random value to the LSB-side of a further digital intermediate value, and/or
   a rounding operator configured to round a second further digital intermediate value up to a predetermined accuracy, and/or
   a clipping operator configured to clip a third further digital intermediate value in case it exceeds the maximum digital output value.

6. The processing arrangement according to claim 1, wherein the second calculation block further comprises a cascade of circuits, the cascade being configured to determine a digital output word forming the square root of a digital input word, and wherein each circuit within the cascade comprises
   a first input for receiving a portion of the digital input word of maximum two bits,
   a logic block configured to determine an output bit of the digital output word and a temporary calculation rest based on the portion of the digital input word, and
   a first output for forwarding of at least a portion of the digital output word as a temporary calculation result.

7. The processing arrangement according to claim 6, wherein each circuit except a first circuit and a last circuit within the cascade further comprises
   a second input for receiving the temporary calculation rest of a preceding circuit,
   a third input for receiving the temporary calculation result from the first output of the preceding circuit, and
   a second output for forwarding the temporary calculation rest of the circuit to the second input of a subsequent circuit.

8. The processing arrangement according to claim 7, wherein the first circuit within the cascade further comprises
   a second input for receiving a logical "0" as the temporary calculation rest, and
   a second output for forwarding the temporary calculation rest of the first circuit to the second input of the subsequent circuit,
   and wherein the last circuit within the cascade further comprises
   a second input for receiving the temporary calculation rest from the second output of the preceding circuit,
   a third input for receiving the temporary calculation result from the first output of the preceding circuit, and wherein
   the first output of the last circuit forwards the output word.

9. The processing arrangement according to claim 1, which is implemented as an integrated circuit, in particular as an application-specific integrated circuit, ASIC.

10. An image sensor comprising the processing arrangement according to claim 1, the image sensor providing sensor values from a plurality of image pixels, wherein the processing arrangement converts the sensor values, in particular in a serial fashion.

11. A calculation method for converting digital image data by determining a digital output value from a digital input value based on a linear function and a square root function, the calculation method comprising:

selecting based on a comparison between the digital input value and a threshold value whether the digital output value is determined by a first output value or a second output value, determining the first output value of the linear function, and/or determining a second output value of the square root function by conducting a square root calculation procedure wherein the linear function is defined by y1=A·IN, A being a first factor, and wherein the square root function is defined by y2=C·√(IN−DB), C being a second factor, B being a first subtrahend and D being a second subtrahend.

12. The calculation method according to claim 11, wherein determining the second output value further comprises shifting, based on the size of the digital input value, the digital input value and the second subtrahend two-bit-wise to the side of the Most Significant Bit, MSB, determining a digital input word INW=IN′− D′, where IN′ is the shifted digital input value and D′ is the shifted second subtrahend, determining a digital output word OUTW=√INW by performing the square root calculation procedure, providing the second factor as a mantissa term and an exponential term, determining a digital intermediate value by

IMD1=C_VAL·OUTW, shifting, based on the size of the digital input value and the exponential term, the digital intermediate value bit-wise to the side of the Least Significant Bit, LSB, and determining a further digital intermediate value by IMD2=IMD1′−B, where IMD1′ is the shifted digital intermediate value.

13. The calculation method according to claim 11, wherein the square root calculation procedure for determining a digital output word from a digital input word further comprises splitting the digital input word into portions of maximum two bits, assigning each portion of the digital input word to subsequent calculation steps, starting with the portion on the MSB-side of the digital input word and proceeding with subsequent portions towards the LSB-side, wherein each calculation step comprises forming a temporary calculation rest by concatenating the respective portion of the calculation step to the temporary calculation rest of a preceding calculation step, if a preceding calculation step is present, determining an internal calculation error by Y=4·R+1, where R is a temporary calculation result of the preceding calculation step, if a preceding calculation step is present, comparing the temporary calculation rest with the internal calculation error, concatenating a logical "1" bit to the temporary result and adjusting the temporary calculation rest by subtracting the internal calculation error, if the internal calculation error is smaller than or equal as the temporary calculation rest, concatenating a logical "0" bit to the temporary result, if the internal calculation error is larger than the temporary calculation rest.

* * * * *